United States Patent [19]
Mathys

[11] 3,781,918
[45] Jan. 1, 1974

[54] ARTIFICIAL JOINT SOCKET
[76] Inventor: Robert Mathys, Guterstrasse 5, Bettlach, Switzerland
[22] Filed: Oct. 30, 1972
[21] Appl. No.: 302,017

[30] Foreign Application Priority Data
Nov. 29, 1971 Switzerland............... 017317/71

[52] U.S. Cl. ..................................... 3/1, 128/92 C
[51] Int. Cl. ............................................. A61f 1/24
[58] Field of Search............. 3/1; 128/92 C, 92 CA, 128/92 R

[56] References Cited
UNITED STATES PATENTS
2,679,245  5/1954  Timmermans............... 128/92 CA
3,140,712  7/1964  Hunter........................ 128/92 C
3,521,302  7/1970  Muller........................ 3/1
3,528,109  9/1970  Seales......................... 3/1
3,685,058  8/1972  Tronzo........................ 3/1

FOREIGN PATENTS OR APPLICATIONS
1,047,640  7/1953  France...................... 128/92 C Primary Examiner—Richard A. Gaudet
Assistant Examiner—Ronald L. Frinks
Attorney—Werner W. Kleeman

[57] ABSTRACT

An artificial plastic joint socket comprising a plastic joint socket body having a segmented spherical-shaped outer surface equipped with recesses for growth therein of the bone. Two essentially parallel plugs protrude from the outer surface of the joint socket body and are elastically connected therewith in such a manner that such plugs can adjust themselves with regard to the segmented spherical-shaped joint socket body owing to the bending forces occurring during implantation into the bone.

4 Claims, 2 Drawing Figures

ARTIFICIAL JOINT SOCKET

BACKGROUND OF THE INVENTION

The present invention relates to a new and improved construction of artificial joint socket formed of plastic.

Such prior art segmented spherical-shaped or cup-shaped structures are bonded in the bone by means of a bone cement. Yet, the bone cement which is employed possesses a damaging effect upon the bone tissue in that it tends to destroy the surface thereof and thus prevents growth of the bone into the artificial joint socket. Therefore, it is readily understandable that other attachment techniques are desired for such joint sockets.

SUMMARY OF THE INVENTION

It is therefore a primary object of the present invention to provide a unique technique for securing such joint sockets into the bone in a manner not associated with the aforementioned drawbacks of the prior art proposals.

Now in order to implement this and still further objects of the invention, which will become more readily apparent as the description proceeds, the artificial joint socket of this development is manifested by the features that it comprises a substantially semi-spherical shaped or segmented spherical-shaped joint socket body having a segmented spherical-shaped outer surface which is provided with grooves for the growth therein of the bone. Two parallel plugs protrude from the outer surface of the joint socket body and are elastically connected therewith so that these plugs can adjust themselves with regard to the joint socket body due to the bending forces which arise during implantation into the bone.

The joint socket can be provided with bores for receiving attachment screws which serve for the initial attachment. The plugs are preferably reinforced.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
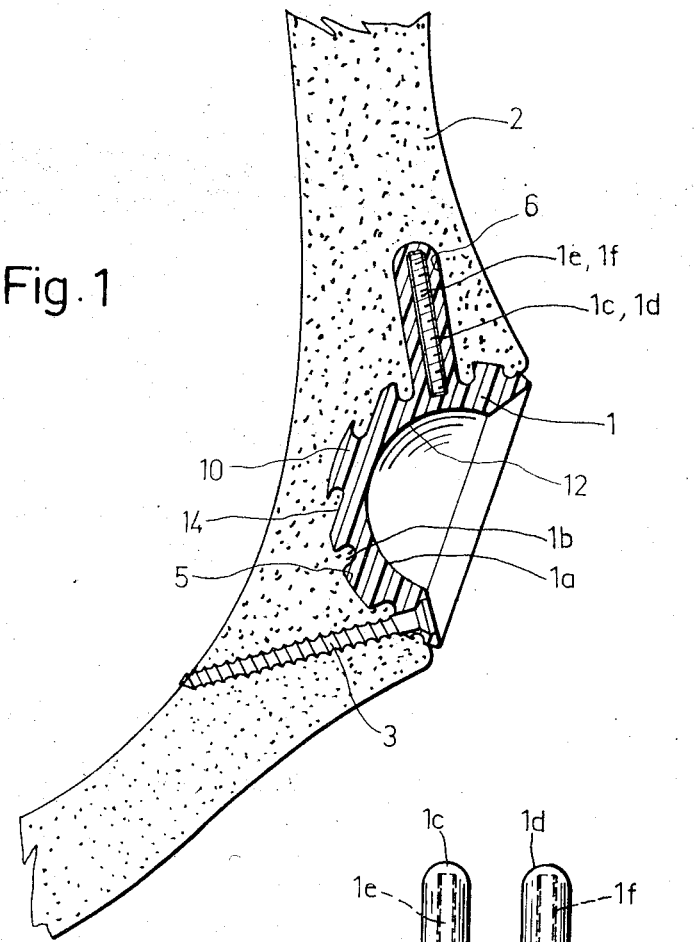
FIG. 1 is a sectional view through an exemplary embodiment of joint socket designed according to the teachings of the present invention and showing same embedded or implanted in a bone.
Figure 2:
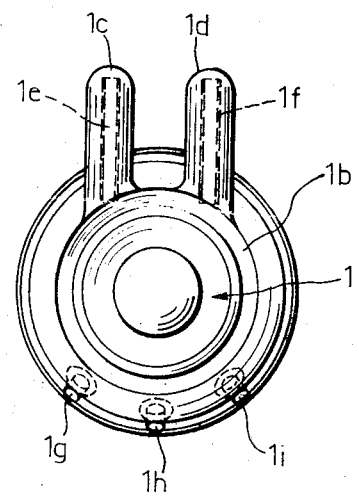
FIG. 2 is an end view of the exemplary embodiment of joint socket depicted in FIG. 1.

Considering now the drawing, and from the sectional view depicted in FIG. 1, it will be apparent that the plastic joint socket 1 depicted in FIG. 2 is intended to be embedded or implanted in a recess 5 of a bone 2, which recess essentially corresponds in shape to the shape of the joint socket 1. This joint socket 1 comprises a semi-spherical shaped or segmented spherical-shaped plastic joint socket body 10 having a smooth semi-spherical shaped inner surface 12 for reception of a joint head which has not been particularly illustrated and at its semi-spherical shaped outer surface 14 is provided with a number of ring-shaped or annularly extending grooves 1b and two parallel plugs or protuberances 1c and 1d. The grooves or depressions 1b serve for receiving the bone which has grown therein and to thus fixedly retain the joint socket 1 in the bone. Both of the plugs 1c and 1d which protrude in parallelism from the outside surface of the body 10 of the joint socket 1 and which are reinforced with metal pins 1e and 1f serve for the fixation of the joint socket 1 in the bone and are elastically connected therewith so that during implanation in the bone they are capable of altering their position with regard to the outside surface of the joint socket owing to the bending forces which thus arise and the joint socket after implantation is therefore fixedly pressed into the hollow cavity or recess 5 provided for this purpose.

Furthermore, the joint socket 1 is equipped with three bores 1g, 1h, and 1i serving to receive bone screws 3 for additional connection or attachment, which however are not absolutely and necessary and can be again removed depending upon the judgement of the surgeon.

In order to implant the joint socket into the bone, there is initially cut out of the bone a semi-spherical shaped recess 5 and then there are formed the two bores 6 (only one of which is visible) for both plugs 1c, 1d. In this regard, the axes of the bores enclose with the marginal plane of the semi-spherical shaped recess an angle which is somewhat smaller than the angle between the marginal plane of the joint socket and the axes of the plugs. Consequently, following insertion of the joint socket 1 both of the plugs 1c and 1d cannot return back into their original position relative to the semi-spherical shaped joint socket body 10 and therefore owing to the elastic forces rigidly press the joint socket into the recess provided for this purpose. In reality, a single plug would be satisfactory for this purpose, but to prevent any possible rotation about its axis, there are provided two such fixation plugs.

While there is shown and described present preferred embodiments of the invention, it is to be distinctly understood that the invention is not limited thereto but may be otherwise variously embodied and practiced within the scope of the following claims. Accordingly,

What is claimed is:

1. An articial joint socket formed of plastic for implantation in a bone comprising a plastic substantially semispherical shaped joint socket body having a segmented spherical shaped outer surface provided with depressions for the growth therein of the bone, a pair of plugs which are substantially in parallelism with one another protruding from the outer surface of the substantially semi-spherical shaped joint socket body and elastically connected therewith in such a manner that such can adjust themselves with respect to the joint socket body owing to the bending forces which arise during implanting in the bone.

2. The joint socket as defined in claim 1, further including means for reinforcing the plugs.

3. The joint socket as defined in claim 1, wherein the depressions for the growth therein of the bone are in the form of ring-shaped grooves.

4. The joint socket as defined in claim 1, wherein the joint socket body has an edge portion provided with at least one bore for receiving an attachment screw.

* * * * *